(12) United States Patent
Girardier et al.

(10) Patent No.: US 11,089,496 B2
(45) Date of Patent: Aug. 10, 2021

(54) OBTENTION OF LATENCY INFORMATION IN A WIRELESS AUDIO SYSTEM

(71) Applicant: TAP SOUND SYSTEM, Fontenay-sous-Bois (FR)

(72) Inventors: Thomas Girardier, Bourg la Reine (FR); Julien Goupy, Le Mesnil Saint Denis (FR); Etienne Ruffieux, Paris (FR)

(73) Assignee: TAP SOUND SYSTEM, Fontenay-sous-Bois (FR)

(*) Notice: Subject to any disclaimer, the term of this patent is extended or adjusted under 35 U.S.C. 154(b) by 0 days.

(21) Appl. No.: 16/610,753

(22) PCT Filed: Apr. 24, 2018

(86) PCT No.: PCT/EP2018/060496
§ 371 (c)(1),
(2) Date: Nov. 4, 2019

(87) PCT Pub. No.: WO2018/206287
PCT Pub. Date: Nov. 15, 2018

(65) Prior Publication Data
US 2020/0322818 A1     Oct. 8, 2020

(30) Foreign Application Priority Data

May 11, 2017  (EP) .................................... 17305537

(51) Int. Cl.
*H04W 24/06* (2009.01)
*H04L 12/26* (2006.01)
*H04W 24/04* (2009.01)

(52) U.S. Cl.
CPC ......... *H04W 24/06* (2013.01); *H04L 43/0858* (2013.01); *H04L 43/50* (2013.01); *H04W 24/04* (2013.01); *H04R 2420/07* (2013.01)

(58) Field of Classification Search
CPC .. H04W 24/06; H04W 24/04; H04L 43/0858; H04L 43/50
See application file for complete search history.

(56) References Cited

U.S. PATENT DOCUMENTS 9,165,547 B2    10/2015  Nguyen et al.
2012/0288124 A1* 11/2012 Fejzo ..................... H04S 7/301
                                                       381/303
(Continued)

OTHER PUBLICATIONS

Anonymous, "Detect or Approximate Bluetooth Latency on Android (Audio Playback)—Stack Overflow", Apr. 20, 2016, Retrieved from the Internet: URL:https://stackoverflow.com/questions/35139179/detect-or-approximate-bluetooth-latency-on-android-audio-playback [retrieved on Oct. 16, 2019].

(Continued)

*Primary Examiner* — Siming Liu
(74) *Attorney, Agent, or Firm* — Daylight Law, P.C.

(57) ABSTRACT

The invention relates to a method of determining latency information in a wireless audio system, the wireless audio system comprising at least one wireless receiver, a wireless transmitter and a sound recorder, the method comprising the following steps: transmitting at least one test signal from the wireless transmitter to the wireless receiver, the test signal defining a time reference; playing the test signal at the wireless receiver; acquiring an audio record by the sound recorder while the test signal is played by the wireless receiver; determining, by the sound recorder, a latency information related to the wireless receiver at least based on the time reference and based on the audio record, and the wireless transmitter and the sound recorder being synchronized; transmitting the determined latency information to the wireless transmitter.

23 Claims, 4 Drawing Sheets

(56) References Cited

U.S. PATENT DOCUMENTS

| | | | |
|---|---|---|---|
| 2014/0079223 A1* | 3/2014 | Nguyen | G10K 11/002 381/18 |
| 2015/0195666 A1* | 7/2015 | Massey | G01S 11/14 381/59 |
| 2015/0228282 A1 | 8/2015 | Evrard | |
| 2017/0257722 A1* | 9/2017 | Kerdranvat | H04S 7/301 |

OTHER PUBLICATIONS

Covert, "This app is making Bluetooth speakers even better", New York Post, Dec. 15, 2016, 1 page, retried from the Internet: URL:http://nypost.com/2016/12/15/this-app-is-making-bluetooth-speakers-even-better/ [retrieved Oct. 16, 2019].
European Search Report from European Application No. 17305537.7 filed May 11, 2017, 5 pages.
International Search Report and Written Opinion from International Application No. PCT/EP2018/060496 dated Apr. 24, 2018, 15 pages.

* cited by examiner

OBTENTION OF LATENCY INFORMATION IN A WIRELESS AUDIO SYSTEM

CROSS-REFERENCE TO RELATED APPLICATIONS

This application is a 35 U.S.C. § 371 U.S. National Stage of International Application No. PCT/EP2018/060496, filed Apr. 24, 2018, which claims priority to European Patent Application No. 17305537.7, filed May 11, 2017, all of which are incorporated by reference in their entirety herein for all purposes.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

It is more and more popular to connect a source device (computer, touchpad, mobile phone, etc.) comprising a multimedia content to a wireless speaker adapted to play the sound of the multimedia content.

It is preferable to connect a source device to several wireless speakers, so as to obtain an improved sound quality (for example, a stereo sound, or a 5.1 sound, or other configurations). It is then preferable to synchronize the speakers so that there is no delay between the sounds played on two different speakers.

A similar problem arises in the case of multimedia content other than audio, for example in case of the display of a video. For example, several copies of a same stream can be transmitted, in the context of a live transmission of the video of a conference, on several displays located in the same room.

It can also be the transmission on several displays of videos corresponding to the same scene but from different viewpoints (for example in the context of a video game), the videos being then different.

When all the connected speakers that are used are made by the same manufacturer, and are known by the source device, the manufacturer may develop a synchronization software. Each speaker can, for example, communicate data such as a pointer indicating the next portion of a buffer that is to be read or the state of an internal clock, to the source device, which can be arranged to take appropriate actions.

However, when the source device detects unknown wireless speakers (that is, speakers that have not been previously registered), and also, when these speakers are made by different manufacturers, it is impossible to synchronize the speakers, for which operations and specifications are not known.

Bluetooth is a communication standard well known to the skilled person, defined since 1994, and managed by a group of industrial actors (named Bluetooth Special Interest Group, SIG).

Version 5.0 has been recently released. Bluetooth enables a bidirectional data exchange over short distances (it is called "piconet", which refers to a network covering a personal area). The range of a Bluetooth device is limited to some tens of meters. Bluetooth makes use of radio waves that are comprised in the Ultra High Frequency (UHF) band, that is, between 300 MHz and 3 GHz.

Bluetooth aims at simplifying connection between electronic devices by cancelling wired connections.

Bluetooth speakers are very popular due to their portability.

However, the Bluetooth specification does not enable a Bluetooth chip to transmit several audio streams in parallel to several multimedia devices which are to be synchronized, if the exchange profile named A2DP profile is used.

The A2DP profile does not enable implementation of a synchronized point to multipoint transmission.

The Bluetooth specifications indeed recite: "The following restrictions are applied to this profile: 1. The profile does not support a synchronized point-to-multipoint distribution".

Thus, it is not possible, in theory, to design a control device for synchronizing multimedia Bluetooth devices, the control device comprising only one Bluetooth chip for controlling several multimedia devices, because Bluetooth does not allow it.

Although Bluetooth does not allow it, it could be possible to create, in a single Bluetooth chip of a control device, several Source SEPs to control several Bluetooth devices (instead of having, in a control circuit, as many Bluetooth chips as Bluetooth devices to be controlled). SEP refers to "Stream End Point".

Bluetooth communications are performed point to point between two SEPs. A SEP represents the resources and the capacities of a device. For example, a device such as a mobile phone may include three SEPs, a first one representing its capacities as a video receiver, a second one representing its capacities as an audio receiver with a SBC codec and a third one representing its capacities as audio receiver with an aptX codec. Each codec has to be associated with a SEP that is different from the SEP associated with another codec, but a single codec can be associated with several SEPs.

However, in the case where Bluetooth devices are multimedia Bluetooth devices, there is a problem for synchronizing signals transmitted to each of the multimedia Bluetooth devices, using A2DP.

A2DP means "Advanced Audio Distribution Profile". A conventional A2DP profile defines a set of protocols and procedures for exchanging audio data through Bluetooth between a master device (also named source device) and a slave device (also named sink device or receiver hereafter). This A2DP profile is constructed based on several components that are defined by the Bluetooth specifications.

The profile relies on lower level components that are well known by the person skilled in the art. These components include:
  a baseband component;
  a Link Manager Protocol, LMP, component;
  a Logical Link Control and Adaptation Protocol, L2CAP, component;
  a Service Discovery Protocol, SOP, component.

The A2DP profile also relies on a higher level called application level. It is the layer in which the device determines the transport parameters and the different available services. This layer is also used to choose the codec that is used to transmit the audio data (which can imply decoding following by re-encoding, when the audio stream to transmit is already encoded, which is usually the case).

The A2DP profile also relies on an Audio/Video Distribution Transport Protocol, AVDTP, component, which defines the binary transactions between Bluetooth devices for implementing a flow and for transmitting an audio and/or video stream using L2CAP. Therefore, this encompasses audio stream initiation procedures, audio stream parameter negotiation procedures and audio stream data transmission procedures. AVDTP comprises a signaling entity for negotiating transmission parameters and a transport entity for managing the stream itself. AVDTP defines an audio/video data transport protocol. More precisely, AVDTP concerns audio/video data transport between two SEPs.

A condition that is imposed by AVDTP according to the Bluetooth specification is that, when a connection has been negotiated between two SEPs, these two SEPs must be locked to one another for streaming data. By default, a connected SEP refuses any additional connection. On recent Bluetooth devices, a function named "social mode" enables sometimes to change this default setting. However, this "social mode" function, which enables a new connection, interrupts the pending connection.

There can, for example, be two phones connected to the same Bluetooth loudspeaker. However, there cannot be simultaneous data transmissions. Switching to a new connection implies terminating the previous connection, while keeping the previously connected phone registered in a memory. Consequently, if there is only one source audio SEP on a source device, then one AVDTP transmission can be set up to a given sink device at a given moment, according to the Bluetooth specifications.

The L2CAP layer defines the minimum data exchange protocol of the Bluetooth specifications. The L2CAP layer also enables segmentation and reassembly of packets, multiplexing and Quality of Service, QoS. Starting from the L2CAP layer, the different transport protocols, such as AVDTP, which serve as basis for the different Bluetooth profiles, such as A2DP, can be implemented.

An L2CAP channel is created between a Channel Identifier, CID, of a master device, and the CID of a slave device, thereby enabling exchange of data between these devices. The L2CAP channels are each subjected to settings that enable, in particular, managing the control of the data streams flowing on channels that are defined by L2CAP (L2CAP channels).

To achieve this, different settings can be taken into account independently for each L2CAP channel, in particular:
  an FTO parameter or "Flush TimeOut" defines a timeout of a data packet in a buffer of a master device. This timeout is defined by default (blocking mode), which means that a transmitted packet that does not reach its destination is retransmitted until a packet (the initial one or the retransmitted ones) reaches the destination. The timeout can also be such that there is no retransmission (if the parameter "Flush TimeOut" is fixed to an appropriate value defined in the Bluetooth specifications), which is, stated otherwise, equivalent to a null timeout. The timeout can also have a finite value. There is also a Boolean variable named "flag non-automatically flushable" incorporated in the Bluetooth packets, and that enables to indicate that the packet cannot be automatically cancelled;
  a QoS parameter enabling to define the maximum latency between taking into account the packet to be transmitted in the L2CAP channel, and its effective transmission;
  parameters named "Extended Flow features" replacing and completing the combination of the precited "Flush Timeout" and "QoS" parameters.

These parameters are negotiated between the Bluetooth stack of a Bluetooth master device and the Bluetooth stack of a Bluetooth slave device. All these parameters (including the modes) enable to modify the stream control. Each mode defines a different procedure for managing the data streams.

In the context of classic Bluetooth (named BR/EDR), five operating modes are possible for an L2CAP channel. These modes are:
  Basic Mode;
  Flow Control Mode
  Retransmission Mode;
  Enhanced Retransmission Mode;
  Streaming Mode.

The Basic Mode is set by default and is supported by all the Bluetooth stacks. It does not require any settings. The Flow Control Mode sends packets but does not perform any retransmission of the lost packets. However, these packets (called PDUs) are detected when they are lost, and the Flow Control Mode enables communicating a report listing the lost packets. The Flow Control Mode and the Retransmission Mode can be used only if ERTM and SM are not available. Both these modes (Flow Control Mode and Retransmission Mode) are no longer used. ERTM enables, in particular, taking into account a given maximum number of retransmissions and a given maximum duration during which a retransmission can be performed, and enables identifying the packets that have not been transmitted or that have been transmitted with errors. SM is adapted to asynchronous data streams. It takes into account a finite parameter "Flush Timeout".

An important problem is linked to the synchronization of wireless systems, and not only Bluetooth systems.

From now, the synchronization is performed through synchronizing the clocks of each of the loudspeakers. However, this is only possible if all the software of the receiving loudspeakers can be (remotely for example) controlled. If not, for example because the loudspeakers, or any wireless audio device of the system, are not known from the master device, the master device has to determine the reaction time (delay or internal latency) of each of the loudspeakers, so as to take into account these reaction times when audio data is transmitted to the loudspeakers.

Indeed, all the wireless audio devices (loudspeakers or headphones for example) have different internal latencies as the internal latency varies with the device type, the manufacturer of the device, the version of the software of the wireless audio device, and so on.

The internal latency may depend on processing time, buffering time and on the receiving chipset, and is almost constant for a given wireless audio device (and is also generally constant between two devices of the same device type of a given manufacturer).

Synchronization can be critically required because desynchronization of more than 20 milliseconds can be perceived by the human ear, thereby strongly decreasing the sound produced by the speaker system.

SUMMARY OF THE INVENTION

A first aspect of the invention concerns a method of determining latency information in a wireless audio system, the wireless audio system comprising at least one wireless receiver, a wireless transmitter and a sound recorder, the method comprising the following steps:
  transmitting at least one test signal from the wireless transmitter to the wireless receiver, the test signal defining a time reference;
  playing the test signal at the wireless receiver;
  acquiring an audio record by the sound recorder while the test signal is played by the wireless receiver;
  determining, by the sound recorder, a latency information related to the wireless receiver at least based on the time reference and based on the audio record, the wireless transmitter and the sound recorder being synchronized;

transmitting the determined latency information to the wireless transmitter.

The latency information can subsequently be used by the wireless transmitter to adapt the transmission of the audio data to the at least one receiver, thereby enhancing the synchronization of the wireless audio system.

According to some embodiments, the test signal can be a high frequency signal.

Using a high frequency signal as a test signal prevents corrupting the audio record with ambient noise.

According to some embodiments, the test signal can be a square signal having a rising edge and the time reference can be an instant of the rising edge.

Defining the time reference as the rising edge enables an improvement in the accuracy of the latency information.

In complement, the test signal may further comprise a falling edge after the rising edge, the rising edge and falling edge being separated by a given duration.

The test signal is therefore easy to identify when played by the wireless receiver.

According to some embodiments, an internal latency of the sound recorder can be known, the latency information can be an internal latency of the wireless receiver, and the latency information can be determined based on the time reference, the first audio record and the internal latency of the sound recorder.

Therefore, when the internal latency of the sound recorder is known, the sound recorder can directly determine the internal latency of the wireless receiver. This value can then be stored in the wireless transmitter and can be optionally reported to a remote server in association with an identifier of the wireless receiver.

In complement, the method may further comprise, when determining the latency information, detecting the rising edge of the test signal by the sound recorder, and the latency information can be determined based on the time reference, based on an instant of the detected rising edge and based on the internal latency of the sound recorder.

Calculating the latency information based on the instant of the rising edge improves the accuracy of the latency information.

Alternatively, the method may further comprise, when determining the latency information, detecting the falling edge of the test signal by the sound recorder, and the latency information can be determined based on the time reference, based on an instant of the detected falling edge, based on the given duration and based on the internal latency of the sound recorder.

This increases the accuracy of the latency information.

According to another embodiment, the wireless audio system may comprise a first wireless receiver and a second wireless receiver, a first test signal can be transmitted to the first wireless receiver and a second test signal can be transmitted to the second wireless receiver, the time reference can be a time gap between the first test signal and the second test signal and the latency information can be a difference between a first internal latency of the first receiver and a second internal latency of the second receiver.

This improves the synchronization of the wireless audio system, even though the internal latency of the sound recorder is not known. Indeed, in practice, such internal latency of the sound recorder is challenging to accurately determine.

In complement, a value of the first internal latency can be stored in a database, and the method may further comprise determining the second internal latency based on the difference and based on the value of the first internal latency.

The database can be an internal database of the wireless transmitter, an internal database of the sound recorder or a remote database. Also, the sound recorder and the wireless transmitter can be comprised in one and the same source device. In that case, the database can be an internal database of the source device.

In complement, the method may further comprise transmitting, by the sound recorder or the wireless transmitter, the determined second internal latency associated with an identifier of the second wireless receiver, to a remote server.

Thus, other source devices can access the remote server to retrieve the determined second internal latency. This avoids the need to perform a similar method in other source devices.

A second aspect of the invention concerns a computer program product comprising a computer readable medium having stored thereon computer program instructions loadable into a computing device and adapted to, when loaded into and executed by said computing device, cause the computing device to perform the steps of a method according to the first aspect of the invention.

A third aspect of the invention concerns a wireless audio system comprising a wireless transmitter and a sound recorder, the wireless transmitter and the sound recorder being synchronized; the wireless transmitter comprising a processor configured to transmit at least one test signal to at least one wireless receiver, the test signal defining a time reference; the sound recorder comprising a processor configured for: acquiring an audio record while the test signal is played by the wireless receiver; determining a latency information related to the wireless receiver at least based on the time reference and based on the audio record; and transmitting the determined latency information to the wireless transmitter.

A fourth aspect of the invention concerns a source device comprising a wireless transmitter and a sound recorder, wherein the wireless transmitter and the sound recorder are synchronized; the source device comprising a processor configured for: transmitting at least one test signal to at least one wireless receiver, the test signal defining a time reference; acquiring an audio record while the test signal is played by the wireless receiver; and determining a latency information related to the wireless receiver at least based on the time reference and based on the audio record.

BRIEF DESCRIPTION OF THE DRAWINGS

The present invention is illustrated by way of example, and not by way of limitation, in the figures of the accompanying drawings, in which like reference numerals refer to similar elements.

DESCRIPTION OF PREFERRED EMBODIMENTS

Figure 1:
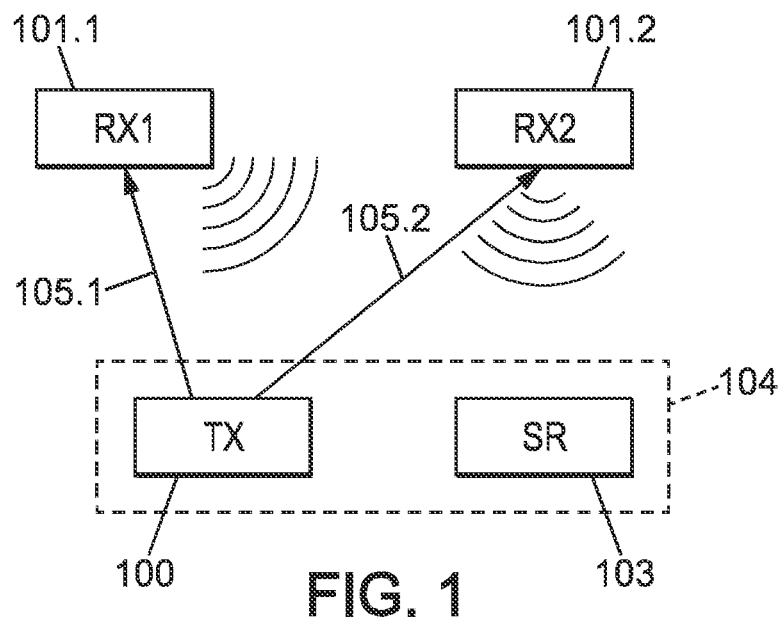
FIG. 1 shows a wireless audio system according to some embodiments of the invention.

FIG. 1 illustrates a wireless audio system according to an embodiment of the invention.

The wireless audio system encompasses any system that comprises at least one source device and at least one sink device, such as a loudspeaker or a headphone, wherein the source device is configured to wirelessly transmit data to the at least one sink device, the sink device being arranged for reproducing the audio data.

The systems and methods disclosed herein are not limited to use with audio data, as they also apply to any data that comprises an audio component, such as video data for example.

Referring to FIG. 1, there is shown a wireless transmitter 100, which is integrated in a source device 104. The source device can for example be a mobile phone, such as a Smartphone. The wireless transmitter 100 is configured for transmitting data to at least one receiver or sink device, such as the first sink device 101.1 and the second sink device 101.2, according to a wireless technology, such as Wi-fi or Bluetooth for example. In what follows, the specific example of Bluetooth communications is considered, for illustrative purposes exclusively.

According to the invention, and as explained hereafter, the internal latencies of the receivers 101.1 and 101.2 are not known in advance by the source device 104. In addition, the first receiver 101.1 and the second receiver 101.2 can be different types of receivers from the same manufacturers, or can be from different manufactures, or can be the same device type (of the same manufacturer) with different software versions, so that their respective internal latencies can be different.

To improve the synchronization of the wireless audio system, specific embodiments of the present invention enable a determination of the internal latency of at least one sink device or receiver.

To this end, the system further comprises a sound recorder 103. Referring to FIG. 1, the sound recorder is integrated into the source device 104. However, the sound recorder 103 and the source device 104 can be separate entities according to some embodiments of the invention, and the sound recorder 103 is, in that case, able to communicate the determined internal latencies, via any wired or wireless transmission means (Wi-fi, Bluetooth, cable, and so on).

A first wireless link 105.1 is established between the wireless transmitter 100 and the first receiver 101.1, and a second wireless link 105.2 between the wireless transmitter 100 and the second receiver 105.2. According to some embodiments, the first and second wireless links 105.1 and 105.2 can be Bluetooth channels, such as L2CAP channels as previously discussed. The wireless transmitter 100 is therefore configured to comprise several SEPs as explained before.

The receivers 101.1 and 101.2 are unknown to the wireless transmitter 100, which means that the wireless transmitter 100 cannot control the software or hardware of the receivers and that the transmitter 100 does not "know" in advance the internal latencies of the receivers 101.1 and 101.2.

Figure 2:
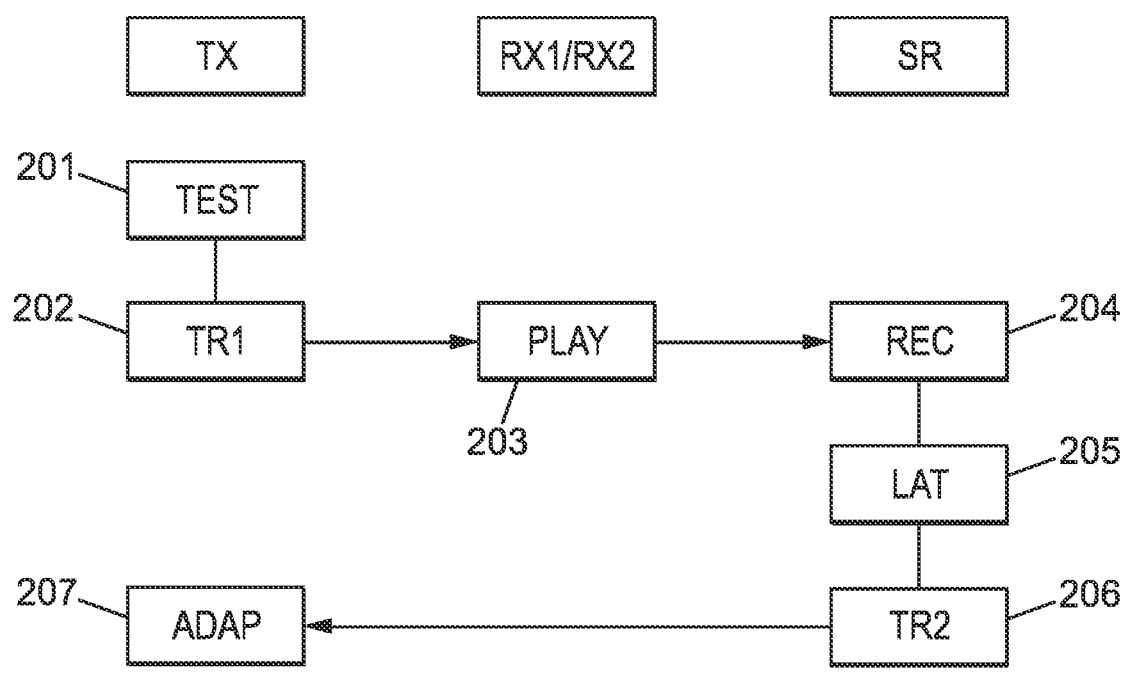
FIG. 2 is a flowchart illustrating a method according to some embodiments of the invention.

FIG. 2 is a diagram illustrating the steps of a method according to some embodiments of the invention.

At step 201, a test signal is generated or obtained from an internal database or from an external entity, by the wireless transmitter 100. The test signal defines a time reference. The time reference of the test signal encompasses any characterizing instant of the test signal, such as the start of the test signal or the end of the test signal for example, relatively to an internal clock of the wireless transmitter 100, and also encompasses any relative time reference, such as a time gap with another test signal, as will be explained hereafter.

At step 202, the test signal is transmitted to at least the first receiver 101.1, and optionally to the second receiver 101.2, as detailed hereafter. The wireless transmitter 100 is synchronized with the sound recorder 103. For example, they can have a common reference clock signal that defines an origin of time.

For example, in the case where both the wireless transmitter 100 and the sound recorder 103 are integrated into the same source device 104, they can receive a clock signal from the same internal clock. However, if the wireless transmitter 100 and the sound recorder 103 are separate entities, the clock signal of the wireless recorder can be transmitted to the sound recorder 103, via any wired or wireless means, so as to ensure that the sound recorder 103 and the wireless transmitter 100 are synchronized.

At step 203, upon reception of the test signal by the first receiver 101.1, the first receiver 101.1 plays or reproduces the test signal. Optionally, in the event where the test signal is also transmitted to the second receiver 101.2, the second receiver 101.2 plays or reproduces the test signal upon receiving it.

At step 204, as the sound recorder 103 and the wireless transmitter 100 are synchronized, the sound recorder 103 starts recording an audio record (a first audio record) before the test signal is transmitted to the at least one receiver 101.1, and the first audio record lasts at least until after the first receiver 101.1 starts playing the received test signal.

At step 205, a latency information about the first receiver 101.1 and/or the second receiver 101.2 is determined by the sound recorder 103, the latency information being determined at least based on the time reference of the test signal and based on the first audio record.

As also explained hereafter, different supplementary data can be used to determine the latency information, depending on the embodiments. The latency information encompasses information that is representative of the internal latency of one of the receivers 101.1 and 101.2 or of a difference between the internal latencies of the receivers 101.1 and 101.2.

At step 206, the latency information can be transmitted, via any wired or wireless means, from the sound recorder 103 to the wireless transmitter 100.

At step 207, the wireless transmitter 100 can adapt the transmission of multimedia data to the first receiver 101.1 and/or to the second receiver 101.2, based on the latency information, which enables to improve the synchronization of the overall wireless audio system.

Detailed embodiments are now described with reference to the following figures.

FIGS. 3a to 3c and 4a to 4c illustrate audio signals emitted and captured by entities of the wireless audio system, according to a first embodiment of the invention.

According to the first embodiment of the invention, the internal latency of the sound recorder 103 is known so that the first internal latency (being an example of latency information) of the first receiver 101.1 can be completely determined based on the time reference of the test signal, based on the first audio record and based on the known internal latency of the sound recorder 103.

Figure 3A:
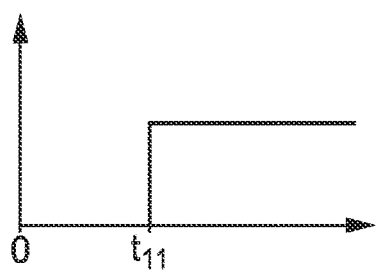
FIGS. 3a to 3c illustrate test signals according to a first implementation of a first embodiment of the invention.
Figure 3B:
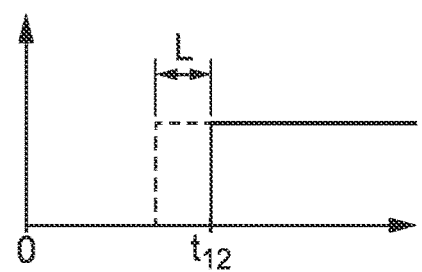
Figure 3C:
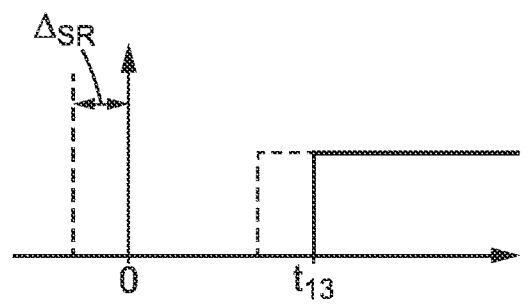

According to a first implementation of the first embodiment, illustrated in FIGS. 3a to 3c, detection of a rising edge of the first audio record is used to estimate the first internal latency of the first receiver.

To this end, the wireless transmitter 100 transmits (at step 202, as explained above) a test signal being a square signal comprising at least a rising edge. The instant of the rising edge is considered as the time reference of the test signal, for illustrative purposes.

For example, the test signal can be a high frequency signal, to avoid the first audio record being corrupted by ambient noise. A high frequency signal can represent any signal that is beyond the audible frequencies. For example, it can be any signal having a frequency higher than 4 kHz, and in practice, any signal having a frequency higher than 19 kHz.

As shown in FIG. 3a, the wireless transmitter 100 transmits the test signal, which comprises a rising edge at an instant $t_{11}$ (the time reference of the test signal) after a local origin of time, which is shared with the sound recorder 103 as explained above (the sound recorder 103 and the wireless transmitter 100 are synchronized).

In FIG. 3b, the first receiver 101.1 plays the test signal, and the rising edge is played at an instant $t_{12}$. Instant $t_{12}$ is delayed by the first internal latency L of the first receiver 101.1, which is to be estimated by the sound recorder 103.

The first audio record acquired by the sound recorder 103 is illustrated on FIG. 3c and the sound recorder 103 can detect the rising edge of the test signal at an instant t13. The rising edge can for example be detected by using a high-pass filter or by using a Fast Fourier Transform, FFT, and calculating the amplitude of the first audio record in the chosen frequency band. Detection of the rising edge can be performed "live" (upon acquisition of the first audio record) or can be delayed compared to the acquisition, by temporarily storing the first audio record in the sound recorder 103.

As can be seen from FIG. 3c, $t_{13}$ is delayed because of the known internal latency of the sound recorder 103, referenced $\Delta_{SR}$ on FIG. 3c.

The sound recorder 103 can then estimate the first internal latency L of the first receiver 101.1 based on the following formula: $L=t_{13}-t_{11}+\Delta_{SR}$.

Figure 4A:
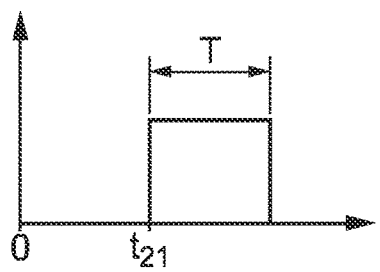
FIGS. 4a to 4c illustrate test signals according to a second implementation of a first embodiment of the invention.
Figure 4B:
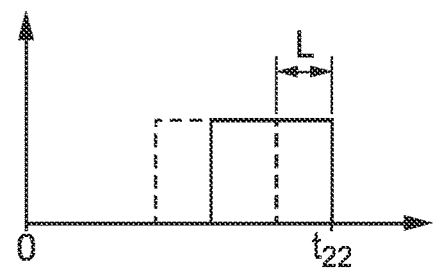
Figure 4C:
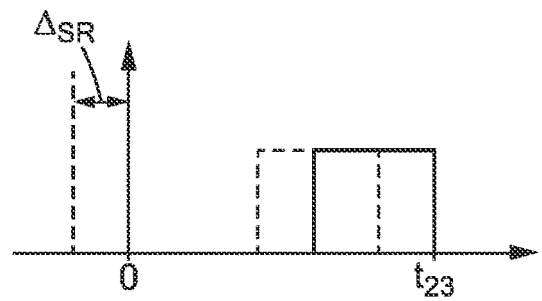

According to a second implementation of the first embodiment, illustrated in FIGS. 4a to 4c, detection of a falling edge of the first audio record is used to estimate the first internal latency of the first receiver. In that case, the test signal comprises a rising edge and a falling edge, and the duration between the rising edge and the falling edge is predetermined and known by the sound recorder 103. As shown in FIG. 4a, the wireless transmitter 100 transmits the test signal, which comprises a rising edge at an instant $t_{21}$ (the time reference of the test signal) after a local origin of time, which is shared with the sound recorder 103 as explained above (the sound recorder 103 and the wireless transmitter 100 are synchronized).

Referring to FIG. 4a, the test signal comprises a rising edge at an instant $t_{21}$, which is considered as time reference of the test signal. The amplitude of the test signal is then maintained over a duration T and then comprises a falling edge. In FIG. 4b, the first receiver 101.1 plays the test signal (which is a sound having a duration of T and the falling edge is played at a time $t_{22}$. $t_{22}$ is delayed by the first internal latency L of the first receiver 101.1, which is to be estimated by the sound recorder 103.

The first audio record acquired by the sound recorder 103 is illustrated on FIG. 4c. The sound recorder 103 can detect the falling edge on the test signal at an instant $t_{23}$. The detection of the falling edge can also be performed using a high-pass filter or by using a Fast Fourier Transform, as explained above.

As can be seen from FIG. 4c, $t_{23}$ is delayed because of the known internal latency of the sound recorder 103, referenced $\Delta_{SR}$ in FIG. 4c.

The sound recorder 103 can then estimate the first internal latency L of the first receiver 101.1 based on the following formula:

$$L=t_{23}-t_{21}-T+\Delta_{SR}$$

In the case where the system comprises the second receiver 101.2, the second internal latency can also be determined using a similar method as the one used for the first receiver 101.1. More generally, all the internal latencies of all the receivers of the wireless audio system can be determined.

According to a second embodiment of the invention, the internal latency of the sound recorder 103 is not known so that the latency information is a difference of internal latencies between the first receiver 101.1 and the second receiver 101.2, the difference being determined by using two receivers as explained hereafter. Simultaneously, the second internal latency of the second receiver 101.2 can be determined.

The second embodiment is illustrated with reference to FIGS. 5a to 5d.

Figure 5A:
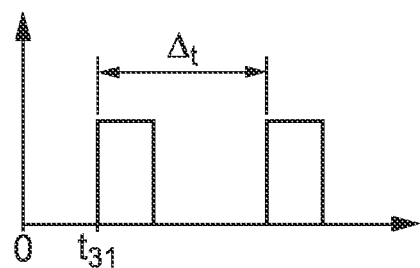
FIGS. 5a to 5d illustrate test signals according to a second first embodiment of the invention.

According to the second embodiment, at step 201, the wireless transmitter 100 generates a first test signal and a second test signal. Both test signals can be the same signals (for example a square signal having a rising edge and a falling edge and a given duration). However, the test signals may also be different. At step 202, the first test signal is transmitted to the first receiver 101.1, then, after a given time gap $\Delta_t$, (which is considered as the time reference of the test signals), the second test signal is transmitted to the second receiver 101.2, as illustrated in FIG. 5a. As for the first embodiment, the first test signal and the second test signal can be high frequency signals, to avoid corrupting the record by the sound recorder 103 with ambient noise.

Figure 5B:
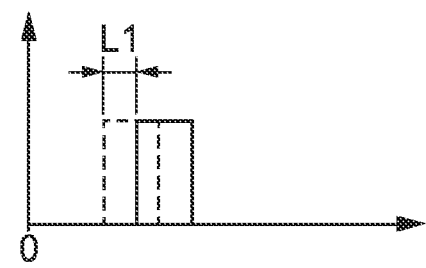
Figure 5C:
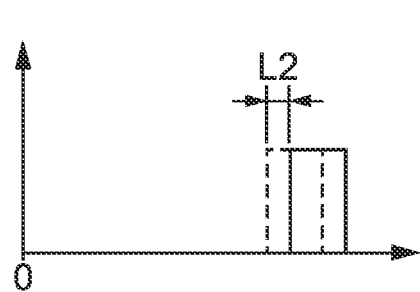

In FIG. 5b, the first receiver 101.1 plays the first test signal, after receiving it and after an internal latency referenced $L_1$ due to internal processing. On FIG. 5c, the second receiver 101.2 plays the second test signal, after receiving it and after an internal latency referenced $L_2$ due to internal processing. In the case where the two receivers are different (from different manufacturers, from the same manufacturers but of different types or different versions), it is likely that their internal latencies $L_1$ and $L_2$ are different.

Figure 5D:
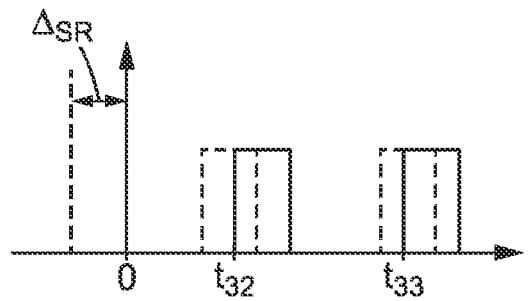

Referring now to FIG. 5d, there is shown the first audio record acquired by the sound recorder 103. The first audio record comprises both the first test signal played by the first receiver 101.1 and the second test signal played by the second receiver 101.2.

The rising edge of the played first test signal can be detected, at instant $t_{32}$ and the rising edge of the played second test signal can be detected at instant $t_{33}$. The rising edges can be determined as already explained above. Alternatively, and as already explained, the detection of rising edges can be replaced with detection of falling edges without departing from the scope of the invention.

The sound recorder 103 can then estimate the difference, noted $\Delta_L$, between the first internal latency of the first receiver 101.1 and the second internal latency of the second receiver 101.2, based on the following:

$$\Delta_L = t_{33} - t_{32} - \Delta_r.$$

The latency information is then the difference $\Delta_L$, which can be advantageously used by the source device 104 to adapt transmission of audio data to the receivers 101.1 and 101.2. For example, if $\Delta_L$ is such that the first internal latency of the first receiver 101.1 is less than the second internal latency of the second receiver 101.2, then audio data sent to the first receiver 101.1 can be delayed by $\Delta_L$ to ensure synchronization between the receivers 101.1 and 101.2.

The advantage of the second embodiment, compared to the first embodiment, is that it does not require knowing the internal latency $\Delta_{SR}$ of the sound recorder 103, which is sometimes hard to determine with accuracy.

It is to be noted that, for the first embodiment and for the second embodiment, the method according to the invention can be repeated to acquire more than the first audio record (second audio record, third audio record, and so on). In that case, a global latency information can be obtained based on the series of latency information that are obtained, for example, using an average calculation or by eliminating the extreme values.

It is also to be noted that the method according to the invention can be performed after clock synchronization between the wireless transmitter and the at least one receiver is stabilized. Indeed, in particular in Bluetooth devices, the slave devices (receiver) generally synchronize their respective internal clocks with a Bluetooth clock of the master device. During this synchronization phase, the rendering delay, which is a delay between transmission of data by the wireless transmitter 100 and outputting of audio data by the receiver, may vary, thereby decreasing the accuracy in the latency information. It is therefore preferable to perform the method according to the invention after the synchronization is stabilized. In addition, the duration required for stabilization may vary depending on the receivers.

For this purpose, the transmission of the test signal can be delayed by a predetermined delay of k seconds, for example 40 seconds. This can be for example the delay between the origin of time in the transmitter and the rising edge of the test signal.

Figure 6:
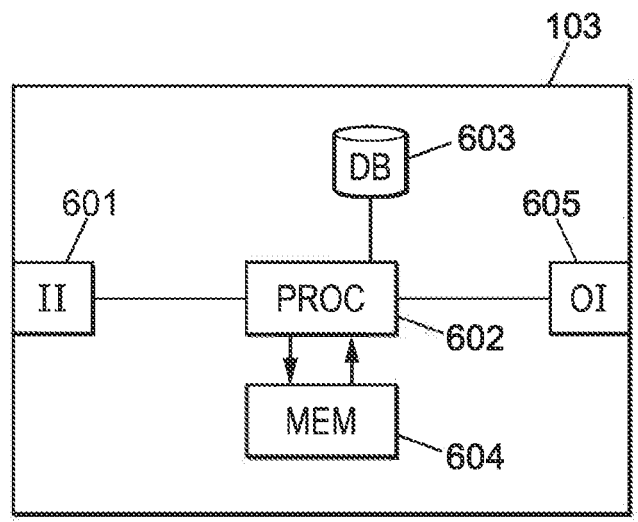
FIG. 6 shows the structure of a sound recorder according to some embodiments of the invention.

FIG. 6 shows a sound recorder 103 according to some embodiments of the invention.

The sound recorder 103 comprises a random access memory 604 and a processor 602 that can store instructions for performing the steps described with reference to FIG. 2, in particular steps 204 to 206.

The sound recorder 103 may also comprise a database 603 for storing data resulting from the method according to the invention, in particular for storing the audio records and/or the latency information that have been determined based on the audio records.

The sound recorder 103 comprises an input interface 601, which is preferably a microphone, to acquire the audio records from the receivers 101.1.

The sound recorder 103 also comprises an output interface 605, for transmitting the latency information to the wireless transmitter 100.

Figure 7:
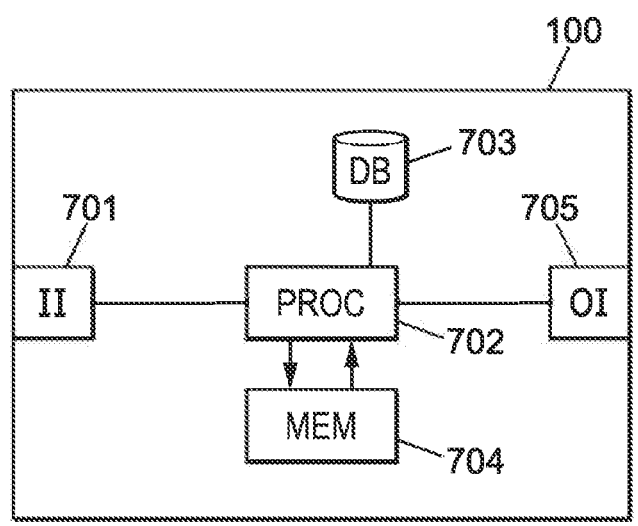
FIG. 7 shows the structure of a wireless transmitter according to some embodiments of the invention.

FIG. 7 shows a wireless transmitter 100 according to some embodiments of the invention.

The wireless transmitter 100 comprises a random access memory 704 and a processor 702 that can store instructions for performing the steps described with reference to FIG. 2, in particular steps 201, 202 and 207.

The wireless transmitter 100 may also comprise a database 703 for storing data resulting from the method according to the invention, in particular for storing the latency information received from the sound recorder 103, so that the processor 702 can adapt the transmission of audio data to the receivers 101.1 and 101.2 based on the latency information.

The wireless transmitter 100 comprises an input interface 701, which is arranged to receive the latency information from the sound recorder 103. The wireless transmitter also comprises an output interface 705, for transmitting audio data to the receivers 101.1 and 101.2 via the channels 105.1 and 105.2.

In view of the above, there is provided a method and a sound recorder that determine latency information that is useful for synchronizing audio data to be transmitted to wireless receivers. This can be used for static synchronization (i.e. assuming that no audio data packet is lost in the system) of a wireless audio system comprising one, or preferably several, wireless receivers such as loudspeakers or headphones. The static synchronization method is described in detail in the French patent application filed under number FR1657050, filed Jul. 22, 2016, which is incorporated by reference herein in its entirety for all purposes, and is not further described in the present application as these subsequent steps are outside the scope of the application.

The microphone of a Smartphone (which can be the source device 104) can be used as a sound recorder. Whenever a new receiver is connected to the source device 104 (assuming there is already another connected receiver), there are two possible cases:

the new receiver is well known by the source device 104 and its internal latency (first embodiment) of the latency difference with the other receiver (second embodiment) is retrieved from an internal database;

the new receiver is unknown to the source device 104 and the latency information can be acquired by performing the methods disclosed herein.

According to the second embodiment, if the latency of the other receiver which is already connected is known, then the internal latency of the new receiver can be determined based on the difference of the latencies obtained from the sound recorder 103. The internal latency of the new receiver can then be stored in a database of the source device 104 and can be uploaded to a remote server so that other source devices of other users can have access to the internal latency of the new receiver, thereby avoiding the need to perform similar operations in the other source devices. If the latency of the other receiver is not known, then the difference L can be stored in the database, until the internal latency of one of the receivers is known. The internal latency of the other receiver can then be deduced from the difference $\Delta_L$, or until a third receiver, which internal latency is known, is connected to the source device, to repeat the methods disclosed herein with the third receiver and the new receiver.

The disclosed methods can be embedded in a computer program product, which comprises all the features enabling the implementation of the methods described herein, and which, when loaded in an information processing system, causes the information processing system to implement the methods. Computer program means or computer program in the present context mean any expression, in any language, code or notation, of a set of instructions intended to cause a system having an information processing capability to perform a particular function either directly or after the conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

A person skilled in the art will readily appreciate that various parameters disclosed in the description may be modified and that various embodiments disclosed and/or claimed may be combined without departing from the scope of the invention.

The invention claimed is:

1. A method of determining latency information in a wireless audio system, the wireless audio system comprising at least one wireless receiver, a wireless transmitter and a sound recorder, the method comprising the following steps:
   transmitting at least one test signal from the wireless transmitter to the wireless receiver, the test signal defining a time reference;
   playing the test signal at the wireless receiver;
   acquiring an audio record by the sound recorder while the test signal is played by the wireless receiver;
   wherein an internal latency of the sound recorder is known;
   determining, by the sound recorder, a latency information related to the wireless receiver at least based on: (i) the time reference; (ii) the audio record; (iii) the wireless transmitter and the sound recorder being synchronized; and (iv) the internal latency of the sound recorder; and
   transmitting the determined latency information to the wireless transmitter.

2. The method according to claim 1, wherein the test signal is a high frequency signal.

3. The method according to claim 1, wherein the test signal is a square signal having a rising edge and wherein the time reference is an instant of the rising edge.

4. The method according to claim 3, wherein:
   the method further comprises, when determining the latency information, detecting the rising edge of the test signal by the sound recorder;
   the latency information is an internal latency of the wireless receiver;
   and
   the latency information is determined based on the time reference, an instant of the detected rising edge, and the internal latency of the sound recorder.

5. The method according to claim 1, wherein:
   the test signal is a square signal having a falling edge after a rising edge;
   the rising edge and falling edge are separated by a known duration; and
   the time reference is the falling edge.

6. The method according to claim 5, wherein:
   the method further comprises, when determining the latency information, detecting the falling edge of the test signal by the sound recorder;
   the latency information is an internal latency of the wireless receiver;
   and
   the latency information is determined based on the time reference, an instant of the detected falling edge, the known duration, and the internal latency of the sound recorder.

7. The method according to claim 1, wherein:
   the latency information is an internal latency of the wireless receiver.

8. The method according to claim 1, wherein:
   the wireless audio system comprises a first wireless receiver and a second wireless receiver,
   a first test signal is transmitted to the first wireless receiver and a second test signal is transmitted to the second wireless receiver,
   the time reference is a time gap between the first test signal and the second test signal; and
   the latency information is a difference between a first internal latency of the first receiver and a second internal latency of the second receiver.

9. The method according to claim 8, wherein:
   a value of the first internal latency is stored in a database:
   and
   the method further comprises determining the second internal latency based on the difference and based on the value of the first internal latency.

10. The method according to claim 9, further comprising:
    transmitting, by the sound recorder or the wireless transmitter, the determined second internal latency associated with an identifier of the second wireless receiver, to a remote server.

11. A non-transitory computer readable medium having stored thereon computer program instructions loadable into a computing device and adapted to, when loaded into and executed by said computing device, cause the computing device to perform the steps of a method according to claim 1.

12. A wireless audio system comprising a wireless transmitter and a sound recorder, wherein the wireless transmitter and the sound recorder are synchronized and an internal latency of the sound recorder is known;
    the wireless transmitter comprising a processor configured to transmit at least one test signal to at least one wireless receiver, the test signal defining a time reference; and the sound recorder comprising a processor configured for: (i) acquiring a first audio record while the test signal is played by the wireless receiver; (ii) determining a latency information related to the wireless receiver at least based on: the time reference the first audio record, and the internal latency of the sound recorder; and (iii) transmitting the determined latency information to the wireless transmitter.

13. A source device comprising a wireless transmitter and a sound recorder, wherein the wireless transmitter and the sound recorder are synchronized and an internal latency of the sound recorder is known, the source device comprising a processor configured for:
    transmitting at least one test signal to at least one wireless receiver, the test signal defining a time reference,
    acquiring a first audio record while the test signal is played by the wireless receiver; and
    determining a latency information related to the wireless receiver at least based on: the time reference, the first audio record, and the internal latency of the sound recorder.

14. A method of determining latency information in a wireless audio system, the wireless audio system comprising at least a first wireless receiver and a second wireless receiver, a wireless transmitter and a sound recorder, the method comprising the following steps:
    transmitting at least one first test signal from the wireless transmitter to the first wireless receiver;
    transmitting at least one second test signal from the wireless transmitter to the second wireless receiver;
    playing the test signals at the wireless receivers;
    acquiring an audio record by the sound recorder while the test signals are played by the wireless receivers;
    determining, by the sound recorder, a latency information related to the wireless receivers at least based on: (i) a time reference; (ii) the audio record; and (iii) the wireless transmitter and the sound recorder being synchronized; and
    transmitting the determined latency information to the wireless transmitter;
    wherein:
    the time reference is a time gap between the first test signal and the second test signal;
    the latency information is a difference between a first internal latency of the first receiver and a second internal latency of the second receiver;
    a value of the first internal latency is stored in a database; and
    the method further comprises determining the second internal latency based on the difference and based on the value of the first internal latency.

15. The method according to claim 14, wherein the test signal is a high frequency signal.

16. The method according to claim 14, wherein the test signal is a square signal having a rising edge and wherein the time reference is an instant of the rising edge.

17. The method according to claim 16, wherein:
    the method further comprises, when determining the latency information, detecting the rising edge of the test signal by the sound recorder;
    the latency information is an internal latency of the wireless receiver;
    an internal latency of the sound recorder is known; and
    the latency information is determined based on the time reference, an instant of the detected rising edge, and the internal latency of the sound recorder.

18. The method according to claim 14, wherein:
    the test signal is a square signal having a falling edge after a rising edge;
    the rising edge and falling edge are separated by a known duration; and
    the time reference is the falling edge.

19. The method according to claim 18, wherein:
    the method further comprises, when determining the latency information, detecting the falling edge of the test signal by the sound recorder;
    the latency information is an internal latency of the wireless receiver;
    an internal latency of the sound recorder is known; and
    the latency information is determined based on the time reference, an instant of the detected falling edge, the known duration, and the internal latency of the sound recorder.

20. The method according to claim 14, wherein:
    the latency information is an internal latency of the wireless receiver.

21. A non-transitory computer readable medium having stored thereon computer program instructions loadable into a computing device and adapted to, when loaded into and executed by said computing device, cause the computing device to perform the steps of a method according to claim 14.

22. A wireless audio system comprising a wireless transmitter and a sound recorder, wherein the wireless transmitter and the sound recorder are synchronized;
    the wireless transmitter comprising a processor configured to:
    transmit at least one first test signal to a first wireless receiver; and
    transmit at least one second test signal to a second wireless receiver;
    the sound recorder comprising a processor configured for: (i) acquiring an audio record while the test signals are played by the wireless receivers; (ii) determining a latency information related to the wireless receivers at least based on a time reference and the audio record; and (iii) transmitting the determined latency information to the wireless transmitter;
    wherein:
    the time reference is a time gap between the first test signal and the second test signal;
    the latency information is a difference between a first internal latency of the first wireless receiver and a second internal latency of the second wireless receiver;
    a value of the first internal latency is stored in a database; and
    the sound recorder further determines the second internal latency based on the difference and based on the value of the first internal latency.

23. A source device comprising a wireless transmitter and a sound recorder, wherein the wireless transmitter and the sound recorder are synchronized, the source device comprising a processor configured for:
    transmitting at least one first test signal to a first wireless receiver;
    transmitting at least one second test signal to a second wireless receiver;
    acquiring an audio record while the test signals are played by the wireless receivers; and
    determining a latency information related to the wireless receivers at least based on a time reference and the audio record;

wherein:
the time reference is a time gap between the first test signal and the second test signal;
the latency information is a difference between a first internal latency of the first receiver and a second internal latency of the second receiver;
a value of the first internal latency is stored in a database; and
the source device further determines the second internal latency based on the difference and based on the value of the first internal latency.

\* \* \* \* \*